United States Patent [19]

Roessler et al.

[11] Patent Number: 5,313,025
[45] Date of Patent: May 17, 1994

[54] DISPLACEMENT AMPLIFIED ACOUSTIC TRANSMITTER

[75] Inventors: Dennis E. Roessler; A. J. Mallett, both of Houston, Tex.

[73] Assignee: Halliburton Logging Services, Inc., Houston, Tex.

[21] Appl. No.: 57,605

[22] Filed: May 5, 1993

[51] Int. Cl.$^5$ .................. G01V 1/143; G01V 1/40
[52] U.S. Cl. .................. 181/106; 181/113; 367/83; 367/912; 175/1
[58] Field of Search .................. 367/83, 85, 143, 912; 381/191, 193; 181/104, 106, 113; 175/1; 73/151

[56] References Cited

U.S. PATENT DOCUMENTS

| | | | |
|---|---|---|---|
| 2,699,835 | 1/1955 | Ide | 181/106 |
| 4,700,803 | 10/1987 | Mallett et al. | 181/106 |
| 4,722,417 | 2/1988 | Selsam | 181/119 |
| 5,080,189 | 1/1992 | Cole | 181/106 |

*Primary Examiner*—Nelson Moskowitz
*Attorney, Agent, or Firm*—Arnold, White & Durkee

[57] ABSTRACT

This disclosure is directed to a displacement amplifier for forming acoustic pulses and more particularly to one which incorporates a flexible movable lightweight diaphragm of rectangular configuration. It has upper and lower ends which are connected to opposing piston rods driven by duplicate pistons and double acting cylinders. The cylinders are located at opposite ends of the diaphragm or membrane. They are supported in an elongate tool which positions the flexible membrane in a generally rectangular window. This enables the membrane to flex as the pistons are driven, thereby enabling the flexure of the membrane to form dipole source for radially directed compression waves transmitted from the membrane in the window.

10 Claims, 1 Drawing Sheet

DISPLACEMENT AMPLIFIED ACOUSTIC TRANSMITTER

BACKGROUND OF THE DISCLOSURE

Acoustic well logging tools are devices that include a vibrator which forms an acoustic wave front in drilling fluid. The drilling fluid, normally known as drilling mud, fills a well borehole where the entire length of the well encloses a column of standing liquid which prevents blowouts. That is, the drilling fluid prevents gaseous petroleum products from being produced and creating an excessive flow before the well can be brought under control. Moreover, drilling fluid is necessary in a well borehole to provide lubrication of the drill bit and to also remove cuttings made by the drill bit during drilling operations. An acoustic transmitter is normally used in a well to perform a test. One purpose of acoustic transmitters is to measure the quality of the bond between the casing which surrounds the well borehole and the surrounding cement layer which is positioned on the exterior of the casing. Moreover, the acoustic device forms a pulse which ideally is varied in frequency to provide maximum adaptability for the acoustic test device. Normally, this is placed in a sonde which has a housing for equipment adapted to be lowered on a well borehole on a logging cable and which is connected to the surface through one or more conductors in the logging cable. This enables signals to be transmitted up the logging cable to located equipment surface. The signals transmitted to the surface are used at the surface to provide data for the quality of the cement bond or other information regarding the partially completed well.

It is necessary to vary the amplitude and the frequency of an acoustic signal. Acoustic transmitters used heretofore have varied widely and have included devices utilizing piezoelectric transducers, electromagnetic transducers or magnetostrictive transducers. Additionally, hydraulically powered transducers have also been used. The amount of power that a transmitter can produce is fairly well defined by the stroke of the mechanism which drives the acoustic transmitter. In addition, the amount of power is also dependent on the cross-sectional area of the device which provides the pulse transmission. The active device can be enlarged to increase its area and thereby increase the power in the stroke. If possible, the area can be expanded by using various magnification devices. This has its own limitations, those being noted below. One way of increasing power is to enhance the piston stroke. This can be done by connecting the driven item with a powered piston through some kind of mechanical linkage or leverage device. As a generalization, this will enhance the stroke but it is accomplished at the cost of increasing the weight of the moving components. If the weight were doubled, the inertial drag on the system would require twice the power. What is desired is a low mass system to reduce the reactionary force resulting from inertia. Otherwise, the inertial drag would become so great that the stroke is reduced when the moving surface or area is operated.

The present disclosure is directed to a large surface area transmitter which is hydraulically powered. It incorporates a relatively light mass, relatively large exposed diaphragm of modest thickness. In one embodiment, it is exposed at both planar faces. The planar faces are preferably exposed so that a positive signal can be transmitted from one face while a negative signal is transmitted from the opposite face. This provides a compression wave on one side while simultaneously forming a rarefaction wave on the opposite side. By doing this, a very large area can be operated. The large area diaphragm which makes up part of the present structure is vibrated by connecting it at two spaced end portions to driver pistons which connect with drive shafts which vibrate the diaphragm. The two pistons are identical in construction and are deployed on opposite sides of the diaphragm. The diaphragm in the preferred embodiment is rectangular to obtain the maximum area. It fits snuggly in the tool housing but it need not be sealed to it. The two hydraulically powered drivers incorporate protruding piston rods (or drive shafts) connected with appropriate pistons. The pistons are received in respective hydraulic cylinders which permit the pistons to be operated in a vibration forming mode of use. More will be noted concerning the hydraulic system which operates the two pistons. Preferably they are operated in a synchronized fashion, namely they operate at the same frequency and are 180° out of phase. Restated, they extend simultaneously and retract simultaneously. This creates a flexure which travels through the flexible diaphragm, forming the propagated wave. Generally speaking, the diaphragm or membrane is curved in the relaxed state. This actually increases the incremental travel distance. Thus, if the ends are deflected only a fraction of an inch, the central portion of the curved diaphragm will travel a much greater distance and thereby form an amplified outwardly radiated signal. This signal is formed from the acoustic diaphragm which functions as a dipole source. The ratio of the displacement of the center of the diaphragm with respect to the length of travel is the effective displacement amplification factor. This is relatively high. Simultaneously the inertial drag on the system is relatively low because the only moving component is the diaphragm and the mud immediately against it. While the two hydraulic pistons move axially, they move in opposite directions to each other to reduce the loads that are inflicted on the supporting tool. One aspect of the present apparatus is that it can be used to form a compression wave which is directed radially outwardly and also form a shear wave moving along the length of the well borehole in which the tool is installed. More particularly, the shear wave is formed so it propagates along the well borehole. The transmitted acoustic waves in the drilling fluid which fills the well enable the acoustic tool to operate in the intended fashion with an appropriate acoustic receiver. It is believed that acoustic receivers of the sort cooperative with this disclosure are well known.

BRIEF SUMMARY OF THE PRESENT DISCLOSURE

The acoustic transmitter of this disclosure is able to be operated at a variable frequency with a variable stroke. It utilizes a pair of separately spaced pistons which are arranged in opposing hydraulic cylinders. They are driven to oscillate in synchronization. In other words, they both oscillate at a common frequency. They include protruding drive shafts which extend into a spaced relationship within a window formed in a logging tool. In the window, the two piston rods connect with a generally rectangular sheet or membrane formed of relatively thin material. It is bowed or flexed in the center. It is bowed so that the central portions are able to pump drilling fluid radially outwardly forming a compression wave transmitted to one side and a rarefication wave transmitted to the opposite side. As will be understood, the transmitted pulses are equal and opposite and differ by 180° in phase.

DETAILED DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

Figure 2:
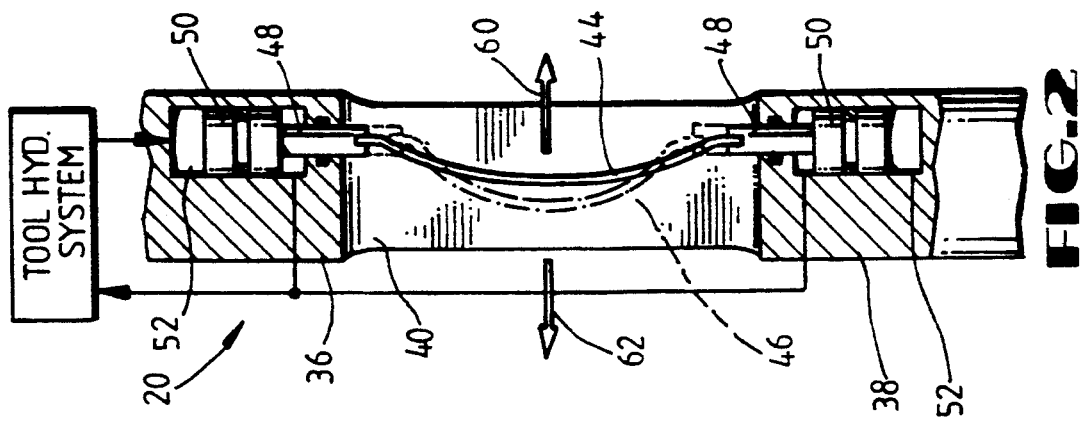
Figure 3:
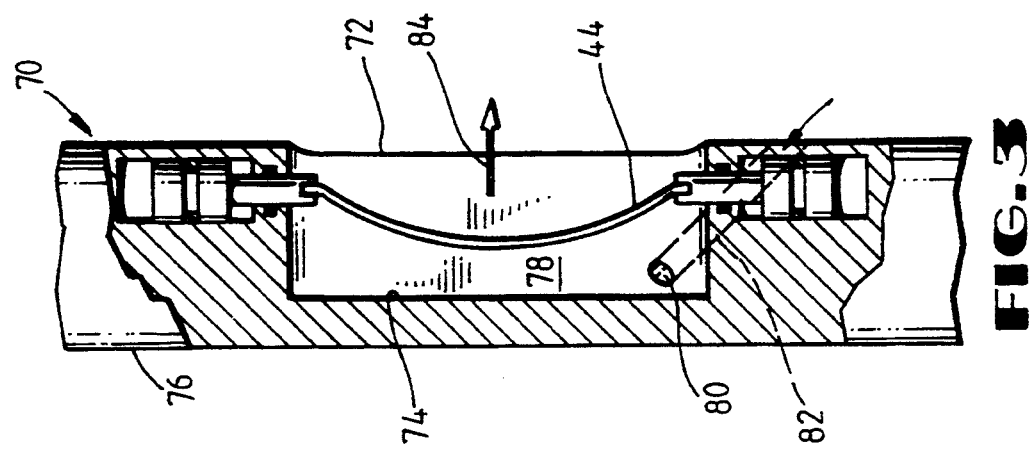
Figure 1:
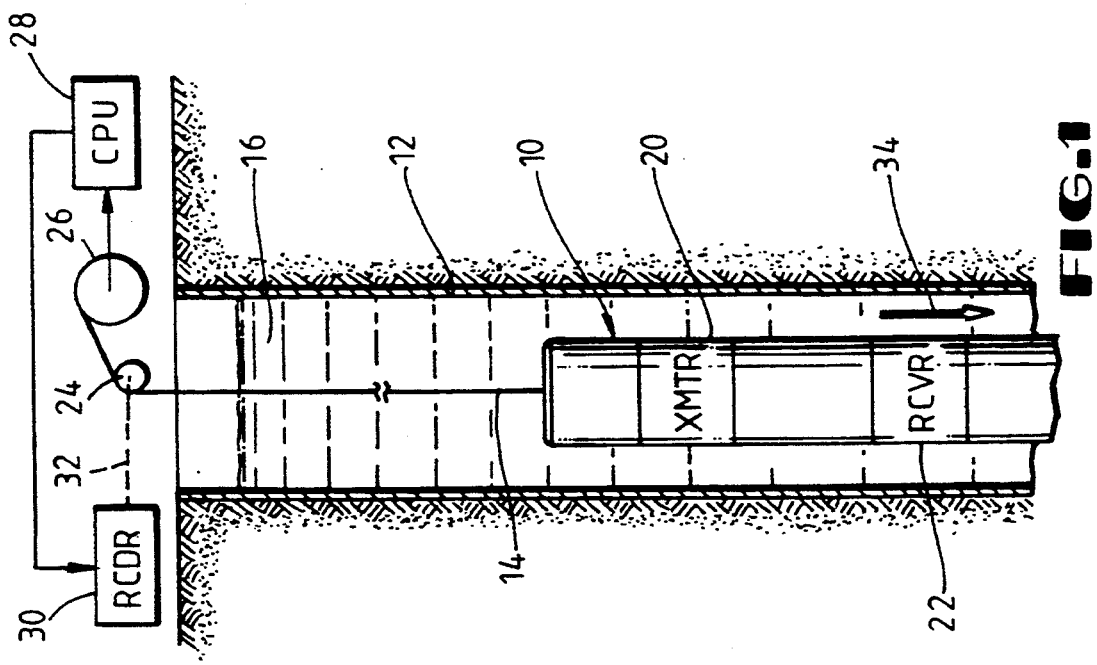

FIG. 1 is a view of an acoustic tool suspended in a well borehole for providing acoustic pulses in the drilling fluid and which is constructed in accordance with the teachings of the present disclosure;

FIG. 2 is a lengthwise sectional view through the acoustic logging tool of FIG. 1 showing details of construction of the transducer of the present disclosure; and FIG. 3 is a view similar to FIG. 2 showing an alternate version of the acoustic transmitter which is different in that it transmits in a single direction while the embodiment of FIG. 2 provides dipole radiation transmitted in opposite directions.

DETAILED DESCRIPTION OF THE PREFERRED EMBODIMENT

Attention is first directed to FIG. 1 of the drawings were the numeral 10 in the present disclosure identifies a sonde which is supported in a well borehole 12. The sonde is supported on a logging cable 14 which includes one or more conductors in it to convey signals to the surface. The sonde 10 is lowered into the well borehole and typically is received in a column of drilling fluid indicated at 16. The well can be of any depth. Typically, during the drilling process, the well will be filled with drilling fluid to assure that formation pressure is counterbalanced to avoid blowouts on drilling into high pressure formations which may produce an excessive flow of petroleum products. Moreover, the drilled well may be an open hole as occurs initially in the drilling process or may be cased partially or totally along the length of the well borehole which is accomplished in the completion stages of the well. Whether open holed or cased, the test system depicts the present apparatus lowered into the well borehole to make measurements. Moreover, this apparatus includes an acoustic tool which has a transmitter indicated generally at 20, and the acoustic transmitter 20 is the apparatus of interest to the present disclosure.

The acoustic transmitter 20 cooperates with an acoustic receiver supported on the sonde, typically at a spaced location along the body of the tool. It is believed that sufficient literature has been written on acoustic tools to describe the sonde supported receiver. The focus in this disclosure is directed to the transmitter 20. However, it cooperates with an acoustic receiver 22 which is able to form an output signal which is transmitted through appropriate telemetry equipment to the surface on the logging cable. The cable 14 passes over the sheave 24 at the surface and the cable is spooled on a large drum 26. The several signals delivered along the logging cable are output to a suitable CPU which processes the data. The CPU 20 forms appropriate output signals which are delivered to a recorder 30. The recorder 30 is connected to the CPU to record the variable signals processed by the CPU. These signals are recorded as a function of depth, the depth being input by an appropriate electrical or mechanical depth recording means 32.

The acoustic transmitter forms a signal which transmitted radially outwardly. Radially from the transmitter, the signal travels as a compression wave. There is however another component of the signal which travels downwardly in the column of drilling fluid. This component of the signal is a shear wave indicated by the arrow 34. The present apparatus will be described in some detail to show how the system forms the radially directed compression wave as well as the shear wave 34 traveling downwardly.

Going now to FIG. 2 of the drawings, the transmitter 20 of the present disclosure is shown in greater detail. The equipment shown in FIG. 2 is mounted in the sonde body. This portion of the tool is depicted as a solid body 36 in the upper portion having a lengthwise rectangular window 40 formed so that it has front and back faces extending at 180° with respect to each other. The window 40 has a finite length and connects with an additional body portion 38 therebelow.

In the window, and especially taking into account that it has a rectangular profile, a thin membrane 44 is positioned. It is shown in the drawings in the full line position and also in a dotted line representation. The flexed position 46 occurs when it is bent further. In the relaxed state, it has a slight flexure or bend in it. The rectangular membrane is preferably formed of a light weight material and is relatively thin. It is preferably formed of a material which is sufficiently flexible and which does not work harden during flexure so that it has long life. Moreover, it is preferably formed of a material which is not harmed by exposure to the drilling fluid 16 in the well borehole. The membrane 44, being rectangular, nevertheless is much longer than it is wide. The length of the window is much greater than the width so that it has a ratio of perhaps 2:1 to 4:1. Tool diameter limits the width of the membrane and surrounding window. Representatives widths are up to about 3 inches which suggests a length of up to about 12 inches. The membrane can be formed of metal or plastic sheet, or a clad metal sheet of up to about 0.125 inches. The spaced ends of the membrane 44 are anchored to exposed piston rods 48. The rods are part of duplicated equipment at the upper and lower ends of the vibrating diaphragm. The diaphragm 44 is flexed by pumping the rods. In other words, the rods are reciprocated in a synchronized fashion. They retract together and they extend together. The rods 48 connect with fluid driven pistons 50 on the ends of the piston rods 48. The rods are reciprocated through a specified stroke by the reciprocated pistons. The pistons in turn are mounted in appropriate double acting cylinders 52. The two cylinders 52 are connected with a hydraulic system which delivers hydraulic fluid at one end and then the other end of the two cylinders. This imparts a reciprocating motion to the systems and hence to the piston rods. A hydraulic system provides hydraulic fluid to drive the pistons in a reciprocating fashion. It is believed that details of such a hydraulic system are readily discernible to those of average skill in the art. The pistons are therefore driven synchronically in a reciprocating fashion.

Since the pistons are placed in cylinders where they are driven in a double acting fashion, this provides a power stroke to extend the piston rods 48 and a power stroke to attract the piston rods. Since they are connected to a common source, they are driven synchronously. Moreover, FIG. 2 represents the tool hydraulic system connected to both ends of the cylinder to assure that positive drive is provided at both ends of the stroke.

One advantage of the present system is the deflection magnification. Assume to purposes of description that the piston stroke is a small distance such as 0.1 inches. With appropriate dimensions and appropriate curvature initially in the diaphragm, the stroke of the diaphragm from the full line position to the dotted line position 46 can be much larger. Moreover, this stroke amplification, while not quite linear, has a region which is approximately linear for specified positions and curvatures so that an increase in piston stroke provides an approximately equal increase proportionately at the midpoint of the diaphragm.

The disclosed system therefore is able to provide a transmitted acoustic pulse in the mud which has an increased amplitude should this be implemented through appropriate control of the hydraulic system.

There variables are important to the shape of the acoustic pulse, and they are duration, the amplitude and frequency. The present system is able to provide both amplitude and frequency variation. They are imparted to the diaphragm by the hydraulically driven pistons connected with the piston rods 48. This permits the system to form the necessary transmitter pulse signals.

On one face of the diaphragm, a radial compression transmission wave is formed. The arrow 60 identifies this particular wave. On the opposite face, there is a rarefication wave transmitted and that is indicated by the arrow 62. Thus, equal and opposite signals are formed so that the system operates as a dipole. When the diaphragm is deflected momentarily to the right as viewed in FIG. 2, a compression wave front is formed in the direction of the arrow 60 while the opposite face of the diaphragm forms a pulse signal propagated in the opposite directions as marked by the arrow 62.

As will be understood from an analysis of the acoustic pulse, the radial or compressive wave front is accompanied by a shear wave front which is propagated along the well borehole. This forms the acoustic energy wave front to obtain a signal output at the receiver 22.

FIG. 3 of the drawings shows an alternate embodiment identified generally by the numeral 70. It is constructed as the embodiment 20 with regard to the hydraulic system, the facing piston rods and pistons which are mounted in double acting cylinders. The diaphragm is also identical. The embodiment 70 differs primarily in that there is only one window. To this end, this detail and difference will be explained carefully to set out the differences in operation. Accordingly, in FIG. 3 the diaphragm 44 faces outwardly from a rectangular window 72. The opposite side of the window is closed by the wall 74 which is a part of the housing 76. This defines a back face cavity 78. If the diaphragm or membrane 44 fits snugly in the window 72, there may well be an impediment formed by the chamber so defined. This problem is reduced, and even avoided by providing one or more ports 80 into this chamber 78 to vent this chamber. A vent passage 82 is incorporated for that purpose.

The passage 82 extends to a displaced location further down the tool. Preferably three or four such passages can be included. They preferably exit at spaced locations on the same side of the tool. It will be appreciated that the membrane in the embodiment 70 forms a pulse signal wave output as indicated by the arrow 84. On the opposite side of the membrane 44, agitation occurs in the chamber 78. No wave is output because there is no access for a wave to emerge from the tool. However, there is a pumping action as acoustic energy is imparted to the drilling fluid in that part of the tool. This is dissipated by pumping drilling fluid from the chamber 78 so that pressure relief occurs through the ports 80. Diffused energy is lost out through the passages 82. It does not interfere with the propagated compression wave transmitted along the line 84 or any shear waves which may travel lengthwise of the tool.

While the foregoing is directed to the preferred embodiment, the scope thereof is determined by the claims which follow:

What is claimed is:

1. An acoustic wave transmitter for use in a well borehole comprising:
   (a) an elongate flexible membrane having spaced ends wherein said membrane is formed of a pliable, relatively thin, lightweight material;
   (b) opposing first and second hydraulically powered motors having membrane connected reciprocating rods at the ends of said membrane so that said rods may reciprocate synchronously to inpart flexure to the membrane wherein flexure results in bowing at the mid portions thereof; and
   (c) a window support structure for said membrane to position said membrane so that said window support structure, when positioned in a well borehole, locates the membrane to form a wave in drilling fluid in the well borehole radiating outwardly therefrom on vibration of said membrane by said motors.

2. The apparatus of claim 1 wherein said membrane is generally rectangular having a length greater than its width, and said tool support structure is formed with a generally rectangular conforming window which surrounds said membrane.

3. The apparatus of claim 1 wherein said membrane has two spaced ends and said ends are connected to said reciprocating rods to flex said membrane.

4. The apparatus of claim 3 wherein said membrane is generally rectangular having a length greater than its width, and said tool support structure is formed with a generally rectangular conforming window which surrounds said membrane.

5. The apparatus of claim 4 wherein said support structure encloses said membrane with said window to face radially outwardly and thereby form a compression wave radially therefrom.

6. The apparatus of claim 1 wherein said support structure incorporates a generally rectangular window on one side thereof and said membrane is positioned within said window, and further incorporates a wall behind said membrane which closes said housing on the opposite side of said membrane to thereby define only a single window.

7. The apparatus of claim 6 wherein said wall and membrane define a chamber on the opposite of said membrane, and further including passage means connected to said chamber to exhaust acoustic vibrations in said chamber.

8. The apparatus of claim 7 including an opening in said chamber connected to said passage means to enable vibrations to flow from said chamber.

9. The apparatus of claim 8 wherein said window support structure includes and connects with an elongate tool body enclosing piston receiving cylinders connected with tool hydraulic system for operation of said powered motors.

10. The apparatus of claim 9 wherein said tool body positions said cylinders aligned with and at spaced locations relative to said membrane to enable said membrane to vibrate when flexed by said cylinders.

* * * * *

UNITED STATES PATENT AND TRADEMARK OFFICE
CERTIFICATE OF CORRECTION

PATENT NO. : 5,313,025
DATED : MAY 17, 1994
INVENTOR(S) : DENNIS E. ROESSLER; A. J. MALLETT

It is certified that error appears in the above-identified patent and that said Letters Patent is hereby corrected as shown below:

In column 1, line 37, after "included", please insert --vibrating--.

Signed and Sealed this

Twenty-seventh Day of September, 1994

Attest:

BRUCE LEHMAN

*Attesting Officer*  *Commissioner of Patents and Trademarks*